United States Patent Office 3,514,256
Patented May 26, 1970

3,514,256
FIBROUS CORUNDUM AND ITS PREPARATION
Kenneth L. Berry, Hockessin, Del., assignor to E. I. du Pont de Nemours and Company, Wilmington, Del., a corporation of Delaware
No Drawing. Filed Nov. 15, 1957, Ser. No. 696,595
Int. Cl. C01f 7/02
U.S. Cl. 23—141       8 Claims This invention relates to aluminum oxides. More particularly, it relates to a new process for making corundum and to new crystalline forms of this oxide.

Corundum ($\alpha$-alumina) occurs widely in nature, particularly in igneous rocks. It can be made by thermal treatment of other forms of alumina. Because of its particular physical properties, especially its chemical, electrical and thermal properties, corundum is useful in many applications. For example, it is used widely in electrical insulation, as catalyst supports, in ceramics and cermets, and in many other applications. It is therefore a desirable goal to provide new methods for making corundum and to provide new crystalline forms of this oxide.

It is an object of this invention to provide a new method for making corundum. Another object is to provide corundum having novel shapes. A further object is to provide a new fibrous form of corundum and a process for its preparation. Still another object is to provide fibrous corundum having high moduli of elasticity and a high degree of refractoriness. Other objects will appear hereinafter.

These and other objects are accomplished by the following invention which comprises preparing corundum by heating aluminum in the presence of hydrogen and an inorganic silicon compound having a Si—O, bonds at a temperature of at least 1100° C. but less than the melting point of corundum. The operating pressure is not critical as atmospheric, subatmospheric and superatmospheric pressures can be employed.

The products of this invention comprise corundum in a form having at least one dimension less than 50 microns and one dimension greater than 50 microns, the average ratio of the longest and shortest dimension being at least 500:1.

It will be understood that any type of aluminum can be used in the process of this invention. Aluminum in the form of powder, granules, foil, ingots, turnings, or flakes is satisfactory. The particle size of the metal is not critical since at the operating temperature the aluminum is molten.

Likewise, any compound having Si—O bonds can be used. Such silicon-containing compounds that are especially suitable in the process of this invention include silica gel, various types of silica and inorganic silicates. For best results, these silicon-containing compounds should be in a finely divided form, i.e., they should have a high surface area per unit weight. Specific silicon compounds that can be used include silica gel, salts of silicic acid, e.g., calcium metasilicate and calcium orthosilicate, quartz, crushed vitreous silica, and silicate minerals such as the feldspars, micas, zeolites, and mullite.

The hydrogen, aluminum metal, and silicon-containing compounds used in the process of this invention can be any of the commercially available grades of these materials.

The hydrogen employed in my novel process can be added directly to the other reactants, or it can be formed in situ by reaction of water with aluminum. It is believed that the material which actually reacts with the aluminum to form corundum is a reaction product of hydrogen and the silicon compound, possibly SiO.

The novel corundum of this invention is in the shape of fibers, filaments, and ribbons, where one dimension is relatively large compared to the other dimensions, and the absolute dimensions have the values defined above. All these forms appear to be single crystals, on the basis of X-ray and polarized light examination. The preferred products of this invention have an average shortest dimension of from 0.5 to 5 microns, an average longest dimension of from 0.5 mm. to 5 cm., and an average ratio of longest to shortest dimension of 1000:1 to 100,000:1.

The corundum of this invention is strong and tough, and has high moduli of elasticity. It is chemically inert and also highly resistant to heat. Because of the particular combination of crystal shape and physical and chemical properties possessed by the corundum of this invention, it is especially useful for the formation of flexible, porous mats that are useful as filtering media and for use as reinforcing agents in plastics, ceramics, and the like.

The process of this invention is conveniently carried out as follows: A shallow refractory container, for example, a sintered alumina boat, is charged with a granular or powdered compound of silicon having Si—O bonds, e.g., silica gel, and another shallow refractory container is charged with granular or powdered aluminum. The charged containers are placed end-to-end in a refractory tube, e.g., an impervious recrystallized alumina tube, a little larger in diameter than the width of the containers containing the reactants.

The reaction tube is evacuated to a pressure of about 1 mm. of mercury or lower and is then heated to a temperature of 800–900° C. Hydrogen is admitted to the reaction tube while the tube is heated to a temperature of 1100–1450° C. or higher, with the hydrogen pressure maintained at atmospheric, superatmospheric or subatmospheric, as desired. Heating in the presence of hydrogen is continued until corundum crystals form on or above the silicon-containing compound at the end of the container nearest the aluminum-containing container.

The corundum obtained in this process is in the form of fine fibers, filaments, and narrow ribbons with the average ratio of the longest dimension to the shortest dimension being at least 500:1.

In an alternative method, in which the hydrogen is generated in situ, shallow refractory containers are charged with silicon-containing compound and with aluminum, preferably with containers of aluminum on either side of a container of the silicon-containing compound. These charged containers are heated in a refractory tube at a temperature of 1100–1450° C. while a stream of inert gas, e.g., argon, containing water vapor is passed through the reaction tube. The water in the argon stream passing through the reaction tube reacts with the aluminum in the first boat forming alumina and by-product hydrogen. The by-product hydrogen enters the flowing gas stream and as it passes over the silicon-containing reactant it reacts therewith. The volatile reaction product of hydrogen and the silicon compound is then carried by the gas stream to the second container of the aluminum, where corundum forms on or above the surface of the aluminum. The corundum obtained in this embodiment is also in the form of fibers, filaments, and ribbons having an average ratio of maximum dimension to minimum dimension of at least 500:1.

In still another embodiment, the process of this invention can be carried out in a static system where the hydrogen is generated in situ. In this embodiment, the silicon-containing compound and the aluminum are placed in refractory containers and these in turn are placed in a reaction tube which can be closed. The closed tube containing the aluminum and silicon reactants is heated to about 800–900° C. for several hours with continuous evacuation to remove water vapor and other gases. The evacuated reaction system is then closed off from the vacuum pump and sufficient water vapor to produce a pressure of about 1 mm. of mercury is admitted to the reaction tube and the tube is then heated at 1100–1200° C. for several hours with more water vapor being added periodically to maintain the desired water vapor pressure in the reaction system. The corundum obtained in this modification of the process is in the form of fine fibers having a very high ratio of maximum dimension to minimum dimension.

The reaction tube can be heated by conventional means. Electric resistance or induction heaters are satisfactory sources of heat. The rate of heating the reaction mixture to the operating temperature is not critical. Likewise the time of heating at the operating temperature is not critical as the corundum fibers which form are stable at temperatures above those required for the formation of the fibers. Corundum appears to form a few minutes after the reaction temperature is reached. However, the reaction is rather slow and heating is preferably continued until all of the silicon-containing reactant, or the aluminum, is used up. Reaction times ranging from 6 to 60 hours or more are satisfactory.

The corundum forms directly on or above the surface of the silicon-containing reactant or the aluminum reactant. It can be removed mechanically from any unreacted starting materials at the end of the reaction period.

The invention is illustrated in further detail by the following examples in which the proportions of ingredients are expressed in parts by weight unless otherwise specified.

EXAMPLE I

A recrystallized alumina reaction vessel having the shape of a boat is charged with 16.614 parts of granular (8–20 mesh) aluminum metal and is placed end-to-end between similar vessels charged with 6.192 parts and 7.187 parts, respectively, of granular silica gel (8–14 mesh) in a tubular reactor constructed of impervious recrystallized alumina.

The reaction tube is evacuated to a pressure of about 1 mm. of mercury by means of a vacuum pump during heating to 900° C. at which point hydrogen is admitted to bring the pressure in the reaction vessel up to atmospheric. The temperature of the reaction vessel is brought up to 1300° C. The hydrogen pressure in the reactor is increased to approximately 860 mm. of mercury. The reaction is continued under these conditions for 8 hours.

Corundum in the form of very fine flat fibers, or ribbons, form on and above the silica gel particles in the regions adjacent to the container of aluminum. These fibers, or ribbons, are approximately 10 microns wide, 0.1 to 1 micron thick, and have lengths ranging from 50 microns to 1 centimeter. The ratio of the longest dimension of these fibers to the shortest dimension ranges from 500:1 to 10,000:1.

EXAMPLE II

Recrystallized alumina reaction vessels of the boat-type are charged with 5.858 parts of granular aluminum, 9.694 parts of granular silica gel, and 6.562 parts of granular aluminum, respectively. These reaction vessels are placed end-to-end in the same order in an impervious recrystallized alumina tubular reactor and heated for a period of 36 hours at 1300–1325° C. under a hydrogen pressure of 860 mm. of mercury.

At the end of a 36-hour period, cotton-like wads of corundum amounting to 0.152 part are obtained in the form of discs filling the cross-section of the reaction tube at both ends of the vessel containing the silical gel where it is in contact with the vessel containing aluminum. These corundum crystals are in the form of fibers having a ratio of longest dimension to smallest dimension of at least 500:1 and range up to about 8000:1. Examination of these fibers in polarized light indicates each fiber to be a single crystal. The fibers give a strong sharp X-ray diffraction pattern corresponding to the standard pattern for corundum, as published on ASTM X-ray powder data card 5-0712.

EXAMPLE III

Impervious recrystallized alumina boats are charged with 6.123 parts of granular aluminum, 2.760 parts of granular silica gel, and 6.475 parts of granular aluminum, respectively, and placed end-to-end in an alumina reaction tube. The tube is heated to 1150–1175° C. under a vacuum of less than 1 mm. of mercury and then a stream of argon containing 0.15 part of water vapor per liter of argon (prepared by bubbling a stream of argon through water at 85–93° C.) is introduced into the heated reaction tube to bring the pressure up to atmospheric. The stream of argon containing water vapor is continued through the heated reaction tube at a rate of 0.4 liter per hour for 60 hours at a temperature of 1150–1175° C.

During this time, the water vapor in the argon oxidizes the surface of the aluminum in the first boat encountered to large spheroidal crusts of prismatic alumina with a resulting weight gain of 0.364 part. By-product hydrogen formed in this reaction then enters the gas stream which on passing over the silica gel and then over the down stream boat of aluminum produces a weight gain of 0.916 part in the latter.

There is formed on and above the surface of the aluminum in the dowstream boat corundum in the form of fine fibers, ribbons, and rods. The fibers and ribbons of corundum have smallest dimensions ranging from 1 to 50 microns and longest dimensions ranging from 0.5 to 7 mm., with ratios of longest dimensions to shortest dimensions ranging from 500 to 7000.

EXAMPLE IV

An impervious recrystallized alumina boat is charged with 3.033 parts of aluminum granules. It is placed adjacent to a similar boat charged with 1.894 parts of the solid condensate of SiO vapor prepared by intimately mixing 0.1 g. atom of powdered silicon with 0.1 mole of finely divided silica in a fused silica boat and heating the mixture at 1450° C. in a closed ceramic tube evacuated to less than 1 mm. Hg pressure. After 10 hours, the tube is cooled and a brown, vitreous-appearing sublimate having the approximate composition SiO is removed mechanically from the interior of the tube at zones which had been at temperatures lower than the reaction mixture.

The boats so charged are heated in an impervious recrystallized alumina tube at 785–890° C. for approximately 20 hours with continuous evacuation to 0.03 mm. of mercury to remove all possible traces of water vapor and other gases. The evacuated system is then closed off and a trace of water vapor sufficient to produce a pressure of about 1 mm. of mercury is admitted to the reaction tube. The tube is heated at 1200–1220° C. for 6 hours. At two more times during this 6-hour period, water vapor sufficient to produce a pressure of 1 mm. of mercury is admitted.

After the tube is cooled to room temperature and the alumina boats removed therefrom, there are found only silicon and corundum on the surface of the boat containing the SiO condensate, as shown by X-ray diffraction identification. The corundum is in the form of a large number of short whiskers or embryonic fibers having an average diameter of 1 to 10 microns and an average length of about 0.5 mm.

EXAMPLE V

Two impervious recrystallized alumina boats are charged with 5.001 and 5.715 parts of granular (8–20 mesh) aluminum and placed end-to-end in the center of a tubular alumina reactor. Porcelain discs containing mullite and silica are placed in the tube about 10 cm. away from both ends of the adjacent vessels of aluminum. Hydrogen is bubbled through water at room temperature at the rate of 6.33 cc. per minute and the resulting gas mixture containing approximately 0.09 g. of water vapor per liter of hydrogen is passed through the reactor tube during heating for three hours at 1290–1300° C.

In this time the upstream charge of aluminum gains 0.167 part in weight and the product comprises flat fibers of corundum overgrown with prismatic crystals of the same material. The downstream charge gains 0.049 part in weight and the product comprises fibrous and ribbon shaped corundum overgrown extensively with prismatic crystals of the same material.

The acicular corundum formed on both vessels is predominantly concentrated at the upstream end of the first vessel and at the downstream end of the second vessel, the greater amount being upstream. This indicates participation of a volatile reactant derived from zones beyond the ends of the vessels, possibly from the porcelain discs. This volatile reactant is believed to be SiO.

It is quite unexpected that the process of this invention, involving heating the aluminum and a silicon compound containing Si—O bonds in the presence of hydrogen at a temperature of at least 1100° C., yields corundum having one dimension relatively large with respect to the other dimensions. Corundum is not formed when aluminum is heated at 1300° C. in the presence of hydrogen but in the absence of a silicon compound having Si—O bonds. When aluminum is heated at 1300° C. in the presence of water vapor and in the absence of any silicon compound having Si—O bonds or in the presence of silicon monoxide under continuous evacuation without water vapor present, the corundum that is formed has only the shapes hitherto known, e.g., prismatic crystals.

Because of its particular physical properties and shape, the corundum of this invention is especially useful in a number of applications. For example, the corundum of this invention having shapes ranging from filaments, fibers, and ribbons, is especially well suited for use as a filler or reinforcing agent in plastics whereby products of improved strength are obtained. For example, the incorporation of 20% by weight of corundum fibers having an average fiber length of about 1 cm. and a ratio of length to shortest dimension of at least 500:1 in a commercial polyester resin binder (consisting of about 33% of monomeric styrene and 67% of propylene glycol maleate alkyd resin) results in the production of laminated articles of improved strength and toughness.

Since the corundum of this invention also possesses a very high degree of refractoriness, such corundum having the shape of fibers, filaments, and ribbons is particularly useful as catalyst supports and as filtering media which can be used at very high temperatures, e.g., for filtering molten metals at temperatures up to 1000° or 1500° C. More particularly, the fibers, filaments, and ribbons of corundum are especially useful for filtering molten aluminum. Aluminum metal which is impure with its oxides and other dross is melted and maintained at a temperature of 700°–800° C. The tip of a pre-heated cylindrical glass rod-forming mold which contains a compressed mat of corundum fibers held in place by a constriction of the bore of the mold is submerged in the melt, and filtered molten aluminum is drawn by vacuum into the mold where it is allowed to solidify by rapid cooling. The mold spontaneously fractures and breaks away revealing an aluminum rod having a brilliant mirror-like surface free of inclusions of foreign materials.

Because of their high resistance to elevated temperatures and to oxidation, the corundum fibers of this invention, having one dimension relatively large in comparison with the other dimensions, are also useful as thermal insulation.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Corundum in the shape of fibers, filaments, and ribbons having at least one dimension less than 50 microns and one dimension greater than 50 microns, the average ratio of the longest to the shortest dimension being at least 500:1.

2. Corundum in the shape of fibers, filaments, and ribbons having an average shortest dimension of from 0.5 to 5 microns, an average longest dimension of from 0.5 mm. to 5 cm., and an average ratio of longest to shortest dimension of 1000:1 to 100,000:1.

3. Needle-like, high strength, virtually perfect single crystals of alpha-aluminum oxide ($\alpha$-$Al_2O_3$) having a hexagonal cross-section and a length from about 1 to 30 mm. long and a width from about 3 to 50 microns.

4. Process for preparing corundum which comprises reacting at a temperature of at least 1100° C., but less than the melting point of corundum, aluminum and an inorganic silicon compound having Si—O bonds at the reaction temperature, said aluminum and inorganic silicon compound being spaced apart and in contact with hydrogen during the reaction.

5. Process of claim 4 wherein the hydrogen is generated in situ by reaction of water with aluminum.

6. Process of claim 4 wherein said inorganic silicon compound having Si—O bonds is in a finely divided form.

7. Process of claim 4 wherein said inorganic silicon compound having Si—O bonds is silica gel.

8. Process of claim 4 wherein the aluminum is aluminum metal of commercially available grade.

References Cited

UNITED STATES PATENTS

| | | | |
|---|---|---|---|
| 2,557,834 | 6/1951 | McMullen | 106—50 |
| 2,699,415 | 1/1955 | Nachtman | 23—141 X |
| 2,731,359 | 1/1956 | Nicholson | 106—65 X |
| 2,741,822 | 4/1956 | Udy | 106—65 X |
| 2,209,908 | 7/1950 | Weiss | 252—464 |
| 2,758,011 | 8/1956 | Bloch | 23—143 |
| 2,800,518 | 7/1957 | Pitzer | 23—141 X |
| 2,810,182 | 10/1957 | Brandes | 106—65 X |
| 2,915,475 | 12/1959 | Bugosh. | |

FOREIGN PATENTS

| | | |
|---|---|---|
| 165,052 | 9/1920 | Great Britain. |

OTHER REFERENCES

Watson et al: Article in Kolloid Zeitshrift, vol. 154, pp. 4–15 inclusive (September 1957).

Mellor: Comprehensive Treatise on Inorganic and Theoretical Chemistry, vol. 5, pp. 259, 265 (1924).

Technical Paper No. 10, Aluminum Company of America, 1953, p. 17.

HERBERT T. CARTER, Primary Examiner

U.S. Cl. X.R.

23—142